US012770989B2

(12) United States Patent
Wang et al.

(10) Patent No.: US 12,770,989 B2
(45) Date of Patent: Oct. 20, 2026

(54) CYLINDRICAL BATTERY

(71) Applicant: CALB Group Co., Ltd., Jiangsu (CN)

(72) Inventors: Yawei Wang, Changzhou (CN); Binwei Qi, Luoyang (CN); Qianqian Sun, Changzhou (CN); Lulu Zhang, Changzhou (CN)

(73) Assignee: CALB Group Co., Ltd., Jiangsu (CN)

( * ) Notice: Subject to any disclaimer, the term of this patent is extended or adjusted under 35 U.S.C. 154(b) by 573 days.

(21) Appl. No.: 18/299,031

(22) Filed: Apr. 11, 2023

(65) Prior Publication Data

US 2024/0128606 A1 Apr. 18, 2024

(30) Foreign Application Priority Data

Oct. 13, 2022 (CN) ........................ 202211256122.8

(51) Int. Cl.

| | |
|---|---|
| ***H01M 50/538*** | (2021.01) |
| ***H01M 50/107*** | (2021.01) |
| ***H01M 50/533*** | (2021.01) |

(52) U.S. Cl.

CPC ....... *H01M 50/538* (2021.01); *H01M 50/107* (2021.01); *H01M 50/533* (2021.01)

(58) Field of Classification Search

CPC .. H01M 50/533; H01M 50/538; H01M 50/54; H01M 50/531; H01M 50/534; H01M 50/536

See application file for complete search history.

(56) References Cited

U.S. PATENT DOCUMENTS

2002/0061435 A1* 5/2002 Hisai ................. H01M 10/0431 429/211
2006/0204841 A1* 9/2006 Satoh .................. H01M 50/533 29/623.2

(Continued)

FOREIGN PATENT DOCUMENTS

CN 215644892 1/2022
CN 217062429 7/2022

(Continued)

OTHER PUBLICATIONS

Machine translation: JP-4729851-B2, 箕浦 敏, (Year: 2026).*

(Continued)

*Primary Examiner* — Kendra Ly

(74) *Attorney, Agent, or Firm* — JCIP GLOBAL INC.

(57) ABSTRACT

The disclosure relates to the technical field of batteries, and a cylindrical battery is provided, including: a single cell housing structure; a core, which is arranged in the single cell housing structure, and the core includes a core body, a first tab and a second tab, and the first tab and the second tab arranged at intervals extend out from the same end of the core body, and the core body is formed with a winding center; the first tab and the second tab are arranged along the circumferential direction of the winding center, and the length of the first tab is greater than the length of the second tab along the radial direction of the winding center. A certain distance may be set between the first tab and the second tab on basis that the first tab and the second tab are able to have sufficient current-passing capability.

13 Claims, 3 Drawing Sheets

(56) References Cited

U.S. PATENT DOCUMENTS

2017/0338462 A1* 11/2017 Imre ................ H01M 10/0422
2017/0346064 A1* 11/2017 Fukuoka ............ H01M 50/534

FOREIGN PATENT DOCUMENTS

| | | | | | |
|---|---|---|---|---|---|
| CN | 217562636 | | | 10/2022 | |
| CN | 115472970 | | | 12/2022 | |
| EP | 4044334 | | | 8/2022 | |
| GB | 2564670 | | | 1/2019 | |
| JP | H11339758 | A | * | 12/1999 | |
| JP | 4729851 | B2 | * | 7/2011 | |
| KR | 102053043 | B1 | * | 12/2019 | .......... H01M 10/052 |

OTHER PUBLICATIONS

Machine translation: KR-102053043-B1, Bong Chul Jee, (Year: 2026).*
Machine translation: JP-H11339758-A, Yamada Haruhiko, (Year: 2026).*
“Search Report of Europe Counterpart Application”, issued on Sep. 25, 2023, p. 1-p. 8.
“Office Action of China Counterpart Application”, issued on Jan. 16, 2026, p. 1-p. 7.
“Examination report of India Counterpart Application”, issued on Jan. 19, 2026, p. 1-p. 7.
“Office Action of China Counterpart Application”, issued on Jul. 1, 2025, p. 1-p. 6.

* cited by examiner

CYLINDRICAL BATTERY

CROSS-REFERENCE TO RELATED APPLICATION

This application claims the priority of China patent application serial no. 202211256122.8, filed on Oct. 13, 2022. The entirety of the above-mentioned patent application is hereby incorporated by reference herein and made a part of this specification.

BACKGROUND

Technical Field

The disclosure relates to the technical field of batteries, in particular to a cylindrical battery.

Description of Related Art

In related art, a cylindrical battery may include tabs arranged at intervals. Due to structural limitations of the tabs, it is difficult to control the positional relationship between adjacent tabs, which results in an unreasonable layout.

SUMMARY

In the first aspect of the present disclosure, a cylindrical battery is provided, including: a single cell housing structure; a core, which is arranged in the single cell housing structure, and the core includes a core body, a first tab and a second tab, and the first tab and the second tab arranged at intervals extend out from the same end of the core body, and the core body is formed with a winding center; the first tab and the second tab are arranged along the circumferential direction of the winding center, and the length of the first tab is greater than the length of the second tab along the radial direction of the winding center.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
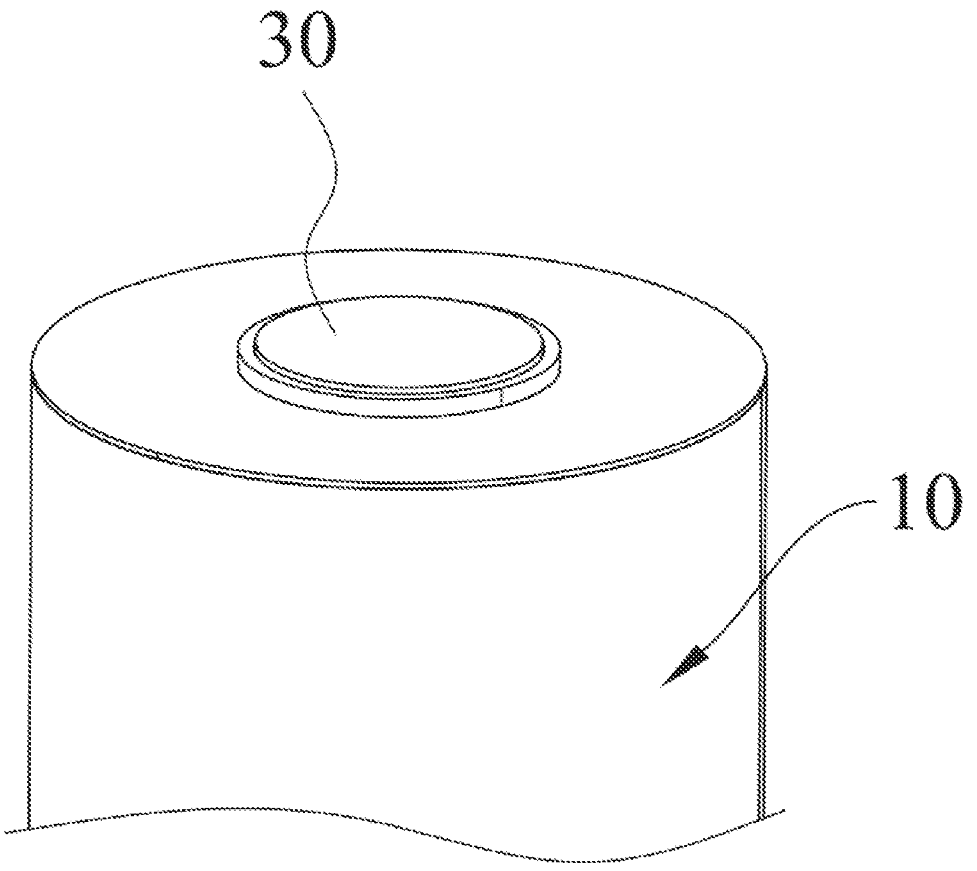
FIG. 1 is a schematic structural view of a battery according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms “first”, “second” and the like are only used for illustrative purposes and are not to be construed as expressing or implying a relative importance. The term “plurality” is two or more. The term “and/or” includes any and all combinations of one or more of the associated listed items.

In particular, a reference to “the” object or “a” and “an” object is intended to denote also one of a possible plurality of such objects. Unless otherwise defined or described, the terms “connect”, “fix” should be broadly interpreted, for example, the term “connect” can be “fixedly connect”, “detachably connect”, “integrally connect”, “electrically connect” or “signal connect”. The term “connect” also can be “directly connect” or “indirectly connect via a medium”. For the persons skilled in the art, the specific meanings of the abovementioned terms in the present disclosure can be understood according to the specific situation.

Further, in the description of the present disclosure, it should be understood that spatially relative terms, such as “above”, “below” “inside”, “outside” and the like, are described based on orientations illustrated in the figures, but are not intended to limit the exemplary embodiments of the present disclosure.

In the context, it should also be understood that when an element or features is provided “outside” or “inside” of another element(s), it can be directly provided “outside” or “inside” of the other element, or be indirectly provided “outside” or “inside” of the another element(s) by an intermediate element.

An embodiment of the disclosure provides a cylindrical battery. Please refer to FIG. 1 to FIG. 3. The cylindrical battery includes: a single cell housing structure 10; a core 20, the core is disposed in the single cell housing structure 10, and the core 20 includes a core body 21, a first tab 22, and a second tab 23, the first tab 22 and the second tab 23 disposed at intervals extend out from the same end of the core body 21, and the core body 21 is formed with a winding center 211; the first tab 22 and the second tab 23 are arranged along the circumferential direction of the winding center 211, and the length of the first tab 22 is greater than the length of the second tab 23 along the radial direction of the winding center 211.

The cylindrical battery in an embodiment of the disclosure includes a single cell housing structure 10 and a core 20. The core 20 is arranged in the single cell housing structure 10, and the core 20 includes a core body 21, a first tab 22 and a second tab 23. Through the configuration that the first tab 22 and the second tab 23 disposed at intervals are arranged along the circumferential direction of the winding center 211, and the length of the first tab 22 is greater than the length of the second tab 23 along the radial direction of the winding center 21, a certain distance may be set between the first tab 22 and the second tab 23 on basis that the first tab 22 and the second tab 23 are able to have sufficient current-passing capability. In this manner, the first tab 22 and the second tab 23 may be reasonably arranged on the core body 21, so that it is possible to increase the space utilization of the core body 21 to improve the operation performance of the cylindrical battery.

It should be noted that the cylindrical battery includes a core and an electrolyte, the minimum unit capable of performing electrochemical reactions such as charging/discharging. The core refers to a unit formed by winding or laminating a stack portion including a first electrode sheet, a separator and a second electrode sheet. When the first electrode sheet is a positive electrode sheet, the second electrode sheet is a negative electrode sheet, and the polarities of the first electrode sheet and the second electrode sheet are interchangeable. The first electrode sheet and the second electrode sheet are coated with active material.

The cylindrical battery may be a wound battery, that is, the first electrode sheet, the second electrode sheet electrically opposite to the first electrode sheet, and the separator arranged between the first electrode sheet and the second electrode sheet are wound to obtain a wound core. After the wound core is formed, a winding center 211 is formed in the middle of the core body 21, and the winding center 211 may be a circular hole. For example, when the first electrode sheet and the second electrode sheet are positive electrode sheet and negative electrode sheet respectively, positive tabs and negative tabs may also be formed on the first electrode sheet and the second electrode sheet, respectively.

The first tab 22 and the second tab 23 may be formed on the first electrode sheet and the second electrode sheet respectively, so that the first tab 22 and the second tab 23 form a positive tab and a negative tab respectively. The length of the first tab 22 is greater than the length of the second tab 23 along the radial direction of the winding center 211. On the basis of ensuring that the first tab 22 has sufficient current-passing capability, it is convenient to control the insulation distance between the first tab 22 and the second tab 23. For example, one side of the first tab 22 away from the winding center 211 and one side of the second tab 23 away from the winding center 211 are on the same circle of the core 20. Under the circumstances, the other side of the first tab 22 close to the winding center 211 will be closer to the winding center 211 than the other side of the second tab 23 close to the winding center 211. Therefore, the insulation distance between the first tab 22 and the second tab 23 may be increased to avoid the risk of insulation failure between the first tab 22 and the second tab 23.

The first tab 22 and the second tab 23 may be formed on the first tab or the second tab simultaneously. Under the circumstances, the first tab 22 and the second tab 23 arranged at intervals may simultaneously form a positive tab or a negative tab. Moreover, the configuration that the length of the first tab 22 is greater than the length of the second tab 23 along the radial direction of the winding center 211 makes it possible for the first tab 22 and the second tab 23 to be arranged on the core body 21 in a more reasonable layout, so as to increase the current-passing capability of the first tab 22 and the second tab 23.

There may be multiple radial directions of the winding center 211, and the length of the first tab 22 may be obtained along the first radial direction of the winding center 211, and the length of the second tab 23 may be obtained along the second radial direction of the winding center 211. Further, the length of the first tab 22 may be considered as the distance between one side of the first tab 22 close to the winding center 211 and the other side of the first tab 22 away from the winding center 211. The length of the second tab 23 may be considered as the distance between one side of the second tab 23 close to the winding center 211 and the other side of the second tab 23 away from the winding center 211. The radial direction of the winding center 211 is indicated as a direction from the center of the winding center 211 toward the circumferential outer edge of the core body 21.

In an embodiment, the length difference between the first tab 22 and the second tab 23 is 0.2 mm to 10 mm, so that the first tab 22 and the second tab 23 are reasonably arranged on the core body 21. In this manner, the space utilization of the core body 21 is increased, and the insulation distance between the first tab 22 and the second tab 23 may be reasonably controlled, thereby improving the operation performance of the battery.

The length difference between the first tab 22 and the second tab 23 may be 0.2 mm, 0.3 mm, 0.4 mm, 0.5 mm, 1 mm, 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 9.6 mm, 9.7 mm, 9.8 mm, 9.9 mm or 10 mm and so on.

Figure 3:
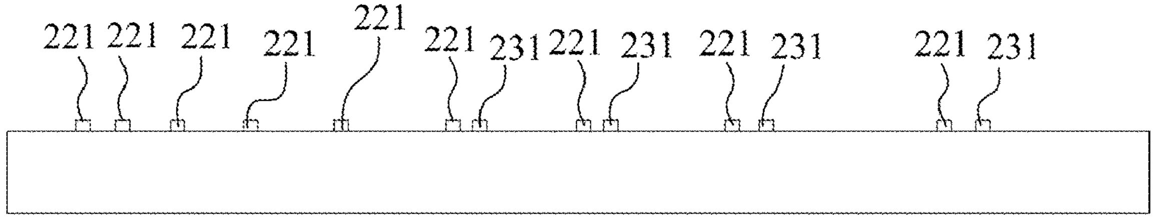
FIG. 3 is a schematic diagram showing a partially unfolded structure of a wound core of a battery according to an exemplary embodiment.

In an embodiment, as shown in FIG. 3, the first tab 22 and the second tab 23 may be formed on the first electrode sheet and the second electrode sheet respectively. The structure shown in FIG. 3 is a structure formed by stacking the first electrode sheet and the second electrode sheet. It can be seen from the figure that the first single-piece tab 221 of the first tab 22 is led out first, and the second single-piece tab 231 of the second tab 23 is led out later. In this way, after the first tab 22 and the second tab 23 are formed by winding, the first tab 22 may be made closer to the winding center 211, so that the length of the first tab 22 is greater than the length of the second tab 23 along the radial direction of the winding center 211.

In an embodiment, along the radial direction of the winding center 211, the first tab 22 includes a plurality of first single-piece tabs 221, the second tab 23 includes a plurality of second single-piece tabs 231, and the number of the first single-piece tab 221 is greater than the number of the second single-piece tab 231. Accordingly, it is possible to make the length of the first tab 22 to be greater than the length of the second tab 23, thereby increasing the current-passing capability of the first tab 22.

A plurality of first single-piece tabs 221 may be gathered to form the first tab 22, and a plurality of second single-piece tabs 231 may be gathered to form the second tab 23. By making the number of the first single-piece tabs 221 greater than the number of the second single-piece tabs 231, after a plurality of first single-piece tabs 221 and a plurality of second single-piece tabs 231 are gathered, it may be ensured that the length of the first tab 22 is greater than the length of the second tab 23.

In an embodiment, along the radial direction of the winding center 211, the first tab 22 includes a plurality of first single-piece tabs 221, the second tab 23 includes a plurality of second single-piece tabs 231. The cohesion of the plurality of first single-piece tabs 221 is greater than the cohesion of the plurality of second single-piece tabs 231, and the length of the first tab 22 is greater than the length of the second tab 23. Therefore, the first tab 22 may have higher connection strength than the second tab 23, and the first tab 22 has a stronger current-passing capability, so that problems such as virtual welding will not occur easily, and the connection stability between the first tab 22 and the electrode lead-out structure may be ensured.

In an embodiment, along the radial direction of the winding center 211, the first tab 22 includes a plurality of first single-piece tabs 221, and the second tab 23 includes a plurality of second single-piece tabs 231. The number of the first single-piece tabs 221 is not greater than the number of the second single-piece tabs 231, and the cohesion of the plurality of first single-piece tabs 221 is lower than the cohesion of the plurality of second single-piece tabs 231, so that the length of the first tab 22 is greater than the length of the second tab 23. By controlling the cohesion of the plurality of first single-piece tabs 221 and the plurality of second single-piece tabs 231, the length of the first tab 22 may also be made longer than that of the second tab 23 when the numbers are inconsistent. To some extent, it is possible to avoid the situation that the number of the first single-piece tabs 221 is too large, which leads to the problem that the core 20 is too heavy.

In an embodiment, along the radial direction of the winding center 211, the first tab 22 includes a plurality of first single-piece tabs 221, the second tab 23 includes a plurality of second single-piece tabs 231, and the length of at least one of the first single-piece tabs 221 is greater than the length of the second single-piece tab 231, so that the length of the first tab 22 may also be greater than the length of the second tab 23. That is, the first single-piece tab 221 with a relatively long length may move closer to the position of the winding center 211 when being gathered, so that the first single-piece tab 221 may extend toward a position close to the winding center 211, so as to increase the length dimension of the first tab 22 along the radial direction of the winding center 211.

The length of the first single-piece tab 221 is the length of the first single-piece tab 221 along the direction in which it is led out, and the length of the second single-piece tab 231 is the length of the second single-piece tab 231 along the direction in which it is led out. The plurality of first single-piece tabs 221 need to be gathered to form the first tab 22, and correspondingly, the plurality of second single-piece tabs 231 need to be gathered to form the second tab 23.

The lead-out direction of the first single-piece tab 221 may be considered as the extending direction of the first single-piece tab 221 after the first single-piece tab 221 is straightened. Correspondingly, the lead-out direction of the second single-piece tab 231 may be considered as the extending direction of the second single-piece tab 231 after the second single-piece tab 231 is straightened. The extending direction of the first single-piece tab 221 and the extending direction of the second single-piece tab 231 are all parallel to the axial direction of the winding center 211.

It should be noted that, along the radial direction of the winding center 211, the length of the first tab 22 is greater than the length of the second tab 23, and the lengths of the first tab 22 and the second tab 23 may be controlled by controlling the cohesion between the single-piece tabs. Alternatively, the lengths of the first tab 22 and the second tab 23 may be controlled by controlling the number of single-piece tabs. Alternatively, the lengths of the first tab 22 and the second tab 23 may be controlled by controlling the length of the single-piece tabs along the lead-out direction thereof.

The cohesion between the single-piece tabs may be considered as the pressing force formed between two adjacent single-piece tabs. When the pressing force between two adjacent single-piece tabs is relatively small, the cohesion is low. When the compressing force between two adjacent single-piece tabs is relatively large, the cohesion is high. For example, when the first tab 22 is formed by three first single-piece tabs 221, and the second tab 23 is formed by three second single-piece tabs 231, it is possible to make the pressing force between the three first single-piece tabs 221 to be relatively small, while the pressing force between the three second single-piece tabs 231 to be relatively large. In this manner, the cohesion between the three first single-piece tabs 221 may be made lower than the cohesion between the three second single-piece tabs 231, so that the length of the first tab 22 is greater than the length of the second tab 23 along the radial direction of the winding center 211.

For example, when the first tab 22 is formed by three first single-piece tabs 221, and the second tab 23 is formed by three second single-piece tabs 231, the length of the three first single-piece tabs 221 along the lead-out direction thereof should be greater than the length of the three second single-piece tabs 231 along the lead-out direction thereof. Under the circumstances, when the three first single-piece tabs 221 are gathered, the three first single-piece tabs 221 may be entirely extended toward the direction of the winding center 211, correspondingly, the three second single-piece tabs 231 may also be entirely extended toward the direction of the winding center 211. However, since the length of the first single-piece tabs 221 along the lead-out direction thereof is greater than the length of the second single-piece tabs 231 along the lead-out direction thereof, it is possible to make the extending length of the three first single-piece tabs 221 toward the winding center 211 to be greater than the extending length of the three second single-piece tabs 231 toward the winding center 211. In this manner, it is possible to make the length of the first tab 22 to be greater than the length of the second tab 23 along the radial direction of the winding center 211.

In some embodiments, it is not excluded that the thickness of the first single-piece tab 221 may be greater than the thickness of the second single-piece tab 231. Therefore, even if the number of the first single-piece tab 221 is consistent with the number of the second single-piece tab 231, the cohesion of the first single-piece tab 221 is consistent with the cohesion of the second single-piece tab 231, and the length of the first single-piece tab 221 is consistent with the length of the second single-piece tab 231, it may still be ensured that the length of the first tab 22 is greater than the length of the second tab 23 along the radial direction of the winding center 211.

In an embodiment, the polarities of the first tab 22 and the second tab 23 are the same, that is, the first tab 22 and the second tab 23 may form a positive tab or a negative tab simultaneously.

In an embodiment, the polarities of the first tab 22 and the second tab 23 are opposite, that is, one of the first tab 22 and the second tab 23 forms a positive tab, and the other forms a negative tab.

In an embodiment, the first tab 22 forms a part of the positive tab. Along the winding direction of the core body 21, the positive tab includes a plurality of positive tab layers arranged at intervals, and the distance between the adjacent positive tab layers gradually increases first, then gradually decreases, and finally increases again. The tab layer includes one or more positive single-piece tabs, so that a longer first tab 22 may be formed on the core body 21.

Along the winding direction of the core body 21, the positive tab includes a plurality of positive tab layers arranged at intervals, that is, one positive tab layer or at least two positive tab layers may be included on each circle of the positive tab. For example, when the positive tab may only include a first tab 22 with a long length, a positive tab layer may be provided on a circle of the positive tab close to the winding center 211. During the process, as the radius of each circle gradually increases, the distance between adjacent positive tab layers gradually increases first. After a certain number of circles are formed by winding, a plurality of positive tab layers arranged at intervals may be provided on one circle. During the process, since there are one positive tab layer to multiple positive tab layers on one circle, although the radius on the corresponding circle increases, the distance between adjacent positive tab layers will decrease. However, as the radius of each circle formed subsequently increases gradually, the distance between adjacent positive tab layers finally increases gradually. During this process, a first tab 22 with a longer length may be formed, and a tab with a shorter length may be formed as well.

In an embodiment, the second tab 23 forms a part of the negative tab. Along the winding direction of the core body 21, the negative tab includes a plurality of negative tab layers arranged at intervals. The distance between adjacent negative tab layers first gradually increases, then gradually decreases, and finally increases again. The negative tab layer includes one or more negative single-piece tabs, so that at least one second tab 23 with a shorter length may be formed on the core body 21.

Along the winding direction of the core body 21, the negative tab includes a plurality of negative tab layers arranged at intervals, that is, one negative tab layer or at least two negative tab layers may be included on each circle of the negative tab. For example, when the negative tab may only include a second tab 23 with a short length, a negative tab layer may be provided on a circle of the negative tab close to the winding center 211. During the process, as the radius of each circle gradually increases, the distance between adjacent negative tab layers gradually increases first. After a certain number of circles are formed by winding, a plurality of negative tab layers arranged at intervals may be provided on one circle. During the process, since there are one negative tab layer to multiple negative tab layers on one circle, although the radius on the corresponding circle increases, the distance between adjacent negative tab layers will decrease. However, as the radius of each circle formed subsequently increases gradually, the distance between adjacent negative tab layers finally increases gradually. During this process, a tab with a longer length may be formed, and a tab 23 with a shorter length may be formed as well.

In an embodiment, the first tab 22 forms a part of the positive tab, the second tab 23 forms a part of the negative tab, and the core 20 is formed by winding a winding unit. Along the winding direction of the core body 21, the winding unit includes a plurality of tab layers arranged at intervals. The distance between adjacent tab layers increases gradually at first, then decreases gradually, and finally increases again. The tab layer includes one or more single-piece tabs.

The winding unit may include a positive electrode sheet and a negative electrode sheet, the positive electrode sheet and the negative electrode sheet are stacked, and a separator may be arranged between the positive electrode sheet and the negative electrode sheet. The winding unit includes a plurality of tab layers arranged at intervals. The tab layer includes a positive tab layer and a negative tab layer. There may be multiple positive tab layers arranged at intervals on the positive electrode sheet, and there may be multiple negative tab layers arranged at intervals on the negative electrode sheet. After straightening the winding unit, it can be seen that the positive tab layer and the negative tab layer are arranged at intervals, and the positive tab layer and the negative tab layer are alternately arranged. The overall forming trend of the distance between the positive tab layer and the negative layer may be gradually increased first, then gradually decreased, and finally increased again. Finally, a first tab 22 with a longer length, a second tab 23 with a shorter length, and other tabs may be formed on the core body 21, which are not limited here.

Figure 4:
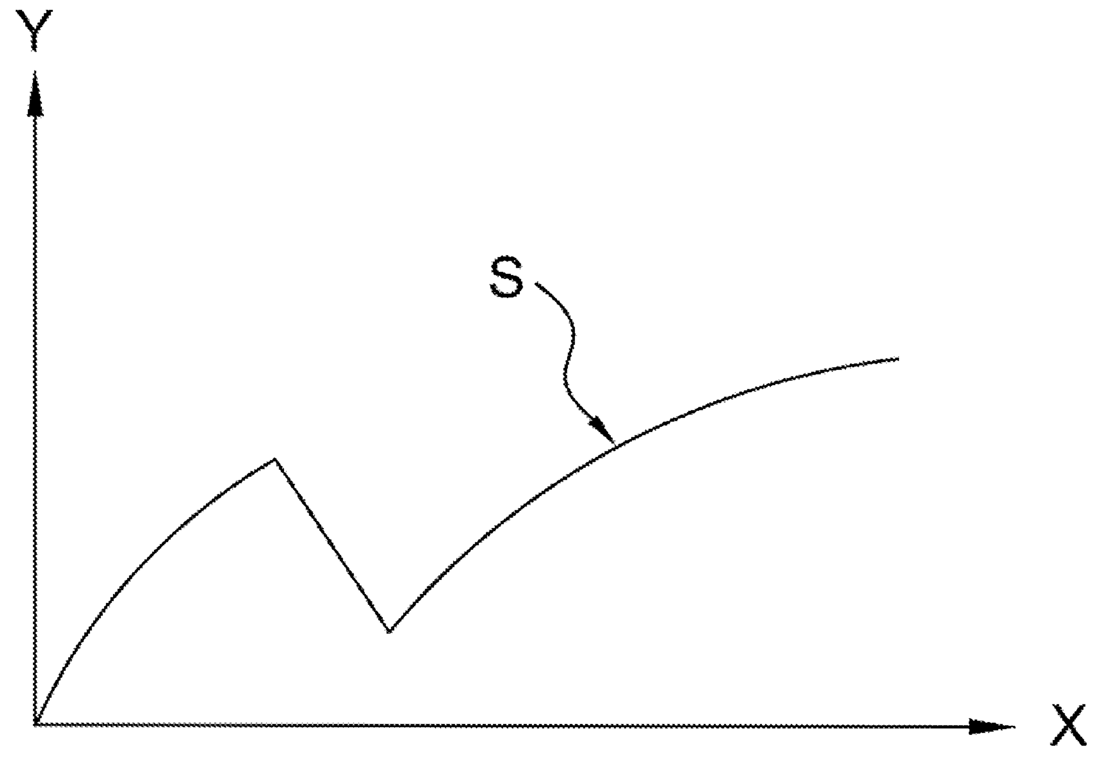
FIG. 4 is an arrangement trend diagram of tab layers of a battery according to an exemplary embodiment.

It should be noted that, in combination with what is shown in FIG. 4, FIG. 4 may indicate an arrangement trend diagram of positive tab layers, where X may represent the extending direction of multiple positive tab layers, Y may represent the distance between adjacent positive tab layers, and S shows the variation trend of the distance between the positive tab layers. Correspondingly, FIG. 4 may also represent an arrangement trend diagram of negative tab layers, where X may represent the extending direction of multiple negative tab layers, Y may represent the distance between adjacent negative tab layers, and S shows the variation trend of the distance between the negative tab layers.

Correspondingly, FIG. 4 may also represent an arrangement trend diagram of tab layers of the winding unit, where X may represent the extending direction of multiple tab layers, Y may represent the distance between adjacent tab layers, and S shows the variation trend of the distance between the tab layers.

The reason that FIG. 4 can be used to represent the variation trends of the above three different distances is the illustration is made on the basis of not taking specific distance values into consideration, and FIG. 4 is only used to display the variation trends of distances.

Figure 2:
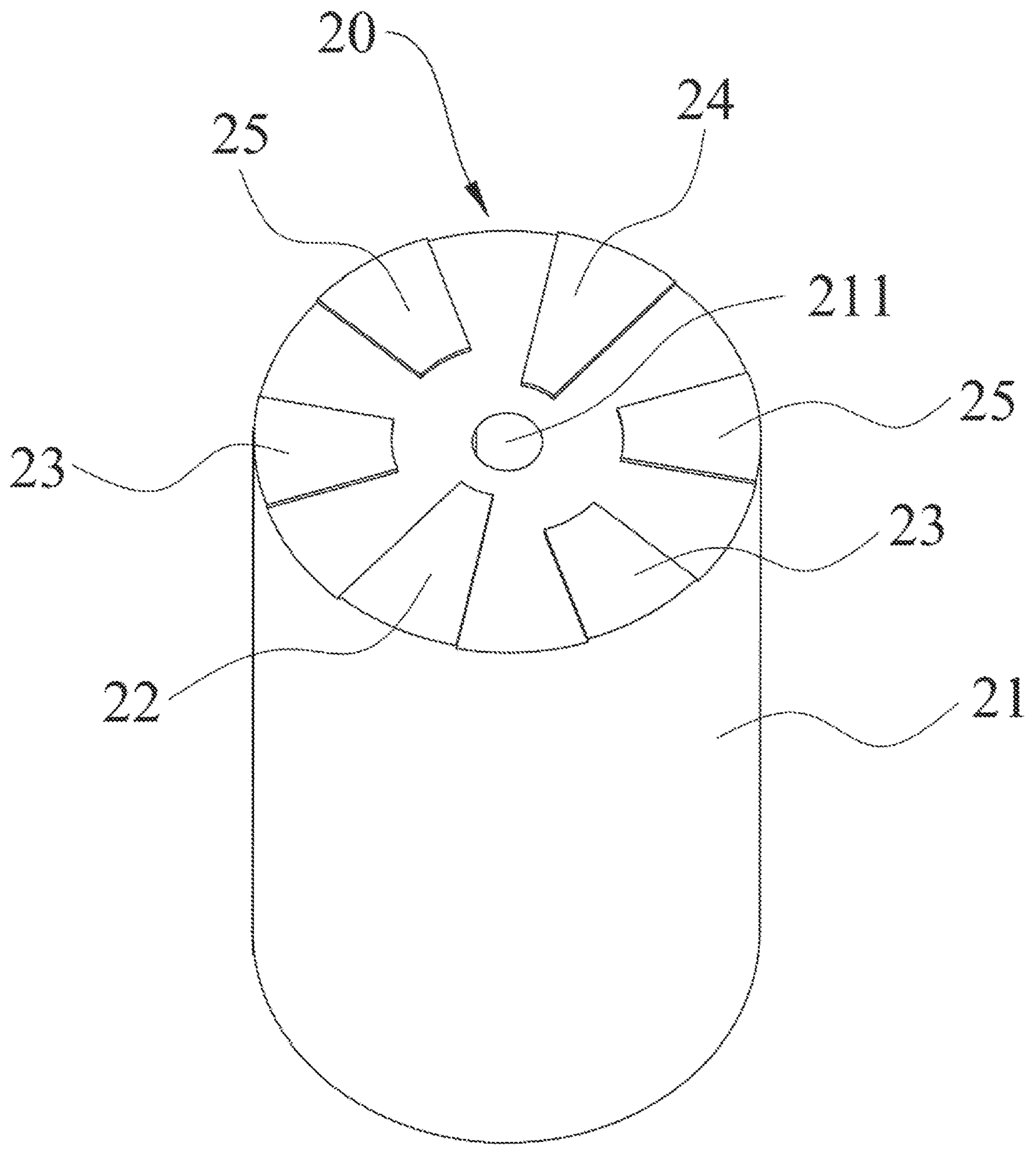
FIG. 2 is a schematic structural view of a core of a battery according to an exemplary embodiment.

In an embodiment, as shown in FIG. 2, there are two second tabs 23, and the first tab 22 is located between the two second tabs 23. On the basis of ensuring a reliable insulation distance between the second tab 23 and the first tab 22, the current-passing capability of the second tab 23 may be ensured.

In an embodiment, as shown in FIG. 2, the core 20 further includes a third tab 24, the polarity of the third tab 24 is the same as that of the second tab 23. The length of the third tab 24 is greater than that of the second tab 23 along the radial direction of the winding center 211, so that the current-passing capability of the second tab 23 and the third tab 24 with the same polarity may be further increased, and the connection strength with the electrode lead-out structure may be improved.

In an embodiment, as shown in FIG. 2, the core 20 further includes two fourth tabs 25, the polarity of the fourth tab 25 is the same as that of the first tab 22, and the third tab 24 is located between two fourth tabs 25. The length of the fourth tab 25 is shorter than the length of the first tab 22 along the radial direction of the winding center 211. On the basis of ensuring that the first tab 22 and the fourth tab 25 have a reliable current-passing capability, the fourth tab 25 and the third tab 24 may also have a reliable insulation capability.

In an embodiment, the distances between the first tab 22, the second tab 23, the third tab 24, and the fourth tab 25 and the winding center 211 are all greater than zero. The first tab 22 and the fourth tab 25 have the same polarity, the first tab 22 and the third tab 24 have the same polarity, and the first tab 22 and the second tab 23 have opposite polarities.

In an embodiment, the first tab 22 and the second tab 23 are arranged along the circumferential direction of the winding center 211. Such configuration not only has a simple structure, and on basis of ensuring the insulation gap between the first tab 22 and the second tab 23, it is also possible to ensure that the first tab 22 and the second tab 23 have a reliable current-passing capability.

As shown in FIG. 2, the first tab 22, the second tab 23, the fourth tab 25, the third tab 24, the fourth tab 25, and the second tab 23 may be arranged along the circumferential direction of the winding center 211, so that the first tab 22 and the two fourth tabs 25 are used to form positive tabs, and the two second tabs 23 and third tabs 24 may be used to form negative tabs, or, the first tab 22 and the two fourth tabs 25 are used to form negative tabs, and the two second tabs 23 and third tabs 24 may be used to form positive tabs.

In an embodiment, the area of the end surface of the first tab 22 away from the core body 21 is larger than the area of the end surface of the second tab 23 away from the core body 21, so that a large contact area is formed between the first tab 22 and the electrode lead-out structure, so as to increase the current-passing capability between the first tab 22 and the electrode lead-out structure.

The area of the end surface of the first tab 22 away from the core body 21 is larger than the area of the end surface of the fourth tab 25 away from the core body 21, and the area of the end surface of the third tab 24 away from the core body 21 is larger than the area of the end surface of the second tab 23 away from the core body 21.

It should be noted that, taking the core 20 in FIG. 2 as an example, the first tab 22 and the two fourth tabs 25 are provided to form positive tabs, while the two second tabs 23 and the third tab 24 may be provided to form negative tabs. Under the circumstances, along the winding direction of the core body 21, the positive tab includes a plurality of positive tab layers arranged at intervals, and the distance between adjacent positive tab layers gradually increases first, and then gradually decreases, and finally increases gradually. Along the winding direction of the core body 21, the negative tab includes a plurality of negative tab layers arranged at intervals, the distance between adjacent negative tab layers gradually increases first, and then gradually decreases, and finally increases gradually. In this manner, after the core 20 is formed by winding, the core 20 as shown in FIG. 2 may be formed.

In an embodiment, as shown in FIG. 1, the cylindrical battery further includes a pole structure 30, which may be arranged on the single cell housing structure 10, and the core 20 may be electrically connected with the pole structure 30. For example, the first tab 22 of the core 20 may be electrically connected to the pole structure 30, and the pole structure 30 may be insulated from the single cell housing structure 10, and the second tab 23 of the core 20 may be electrically connected to the single cell housing structure 10.

The cylindrical battery may include two pole structures 30, and the first tab 22 and the second tab 23 of the core 20 may be electrically connected to the two pole structures 30 respectively.

In an embodiment, the single cell housing structure 10 may include a cover plate and a housing part. The pole structure 30 may be disposed on the cover plate, and the housing part may be formed with an accommodation space, so that after the cover plate and the housing part are connected, it is possible to provide effective protection for the core 20. The cover plate and housing parts may be welded together, or the cover plate and housing parts may be riveted together.

An embodiment of the present disclosure further provides a battery assembly, including the above-mentioned cylindrical battery.

The cylindrical battery of the battery pack of an embodiment of the present disclosure includes a single cell housing structure 10 and a core 20. The core 20 is disposed in the single cell housing structure 10. The core 20 includes a core body 21, a first tab 22 and a second tab 23. By making the first tab 22 and the second tab 23 arranged at intervals be arranged along the circumferential direction of the winding center 211, and the length of the first tab 22 is greater than the length of the second tab 23 along the radial direction of the winding center 211, on basis of ensuring that the first tab 22 and the second tab 23 have sufficient current-passing capability, it is possible to provide a certain distance between the first tab 22 and the second tab 23. In this way, the first tab 22 and the second tab 23 are reasonably arranged on the core body 21 to increase the space utilization of the core body 21 and improve the operation performance of the battery assembly.

In an embodiment, the battery assembly is a battery module or a battery pack.

The battery module includes a plurality of cylindrical batteries, and the battery module may further include a bracket on which the batteries may be fixed.

The battery pack includes a plurality of cylindrical batteries and a box body, and the box body is configured to fix the plurality of cylindrical batteries.

It should be noted that the battery pack includes the cylindrical battery, and there may be a plurality of cylindrical batteries. The plurality of cylindrical batteries are placed in the box body. A plurality of cylindrical batteries may be disposed in the box body after forming into a battery module. Alternatively, a plurality of cylindrical batteries may be directly disposed in the box body, that is, it is not necessary to group the plurality of cylindrical batteries together, and the box body may be used to fix the plurality of cylindrical batteries.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A cylindrical battery, comprising:

a single cell housing structure;

a core, which is arranged in the single cell housing structure, and comprises a core body, a first tab and a second tab, wherein the first tab and the second tab arranged at intervals extend out from a same end of the core body, and the core body is formed with a winding center;

wherein the first tab and the second tab are disposed along a circumferential direction of the winding center, and a length of the first tab is greater than a length of the second tab along a radial direction of the winding center, wherein along the radial direction of the winding center, the first tab comprises a plurality of first single-piece tabs, the second tab comprises a plurality of second single-piece tabs, and the number of the first single-piece tabs is greater than the number of the second single-piece tabs.

2. The cylindrical battery according to claim 1, wherein a length difference between the first tab and the second tab is 0.2 mm to 10 mm.

3. The cylindrical battery according to claim 1, wherein a cohesion of the plurality of first single-piece tabs is greater than a cohesion of the plurality of second single-piece tabs.

4. The cylindrical battery according to claim 1, wherein a length of at least one of the first single-piece tabs is greater than a length of the second single-piece tabs, wherein the length of the first single-piece tabs is a length of the first single-piece tabs along a direction in which it is led out, and the length of the second single-piece tabs is a length of the second single-piece tabs along the direction in which it is led out.

5. The cylindrical battery according to claim 1, wherein polarities of the first tab and the second tab are the same.

6. The cylindrical battery according to claim 1, wherein an area of an end surface of the first tab away from the core body is larger than an area of an end surface of the second tab away from the core body.

7. The cylindrical battery according to claim 1, wherein polarities of the first tab and the second tab are opposite.

8. The cylindrical battery according to claim 7, wherein the first tab forms a part of a positive tab, the second tab forms a part of a negative tab, and the core is formed by winding a winding unit, along a winding direction of the core body, the winding unit comprises a plurality of tab layers arranged at intervals, a distance between the adjacent tab layers increases gradually at first, then decreases gradually, and finally increases again, and the tab layer comprises one or more single-piece tabs.

9. The cylindrical battery according to claim 7, wherein the number of the second tab is two, and the first tab is located between the two second tabs.

10. The cylindrical battery according to claim 7, wherein the first tab forms a part of a positive tab, along a winding direction of the core body, the positive tab comprises a plurality of positive tab layers arranged at intervals, and a distance between the adjacent positive tab layers gradually increases first, then gradually decreases, and finally increases again, the positive tab layer comprises one or more positive single-piece tabs.

11. The cylindrical battery according to claim 10, wherein the second tab forms a part of a negative tab, along the winding direction of the core body, the negative tab comprises a plurality of negative tab layers arranged at intervals, a distance between the adjacent negative tab layers first gradually increases, then gradually decreases, and finally increases again, the negative tab layer comprises one or more negative single-piece tabs.

12. The cylindrical battery according to claim 11, wherein the core further comprises a third tab, a polarity of the third tab is the same as the polarity of the second tab, a length of the third tab is greater than the length of the second tab along the radial direction of the winding center.

13. The cylindrical battery according to claim 12, wherein the core further comprises two fourth tabs, a polarity of the fourth tab is the same as the polarity of the first tab, and the third tab is located between the two fourth tabs, a length of the fourth tab is shorter than the length of the first tab along the radial direction of the winding center.

* * * * *